United States Patent
Naber

(10) Patent No.: US 9,067,347 B2
(45) Date of Patent: Jun. 30, 2015

(54) METHOD FOR MANUFACTURING A PACKAGE

(75) Inventor: Wilhelmus Cornelis Maria Naber, Waalwijk (NL)

(73) Assignee: Naber Beheer B.V., Waalwijk (NL)

( * ) Notice: Subject to any disclaimer, the term of this patent is extended or adjusted under 35 U.S.C. 154(b) by 92 days.

(21) Appl. No.: 13/996,546

(22) PCT Filed: Dec. 20, 2011

(86) PCT No.: PCT/NL2011/000082
§ 371 (c)(1),
(2), (4) Date: Aug. 2, 2013

(87) PCT Pub. No.: WO2012/087114
PCT Pub. Date: Jun. 28, 2012

(65) Prior Publication Data
US 2013/0300028 A1    Nov. 14, 2013

(30) Foreign Application Priority Data
Dec. 22, 2010   (NL) ...................................... 1038469

(51) Int. Cl.
*B29C 45/00* (2006.01)
*B65D 43/02* (2006.01)
(Continued)

(52) U.S. Cl.
CPC ........... *B29C 45/0081* (2013.01); *B29C 45/006* (2013.01); *B29C 2045/0063* (2013.01);
(Continued)

(58) Field of Classification Search
CPC ............. B29C 2045/0065; B65D 2543/00324; B65D 2543/00435

USPC .......................................................... 264/238
See application file for complete search history.

(56) References Cited

U.S. PATENT DOCUMENTS 3,013,308 A * 12/1961 Armour ........................... 29/451
3,515,334 A    6/1970 Jacobson
(Continued)

FOREIGN PATENT DOCUMENTS

DE    9311330 U1    10/1993
DE    20009821 U1    10/2001
(Continued)

OTHER PUBLICATIONS

International Search Report and Written Opinion mailed May 2, 2012 for priority application PCT/NL2011/000082.

*Primary Examiner* — Jill Heitbrink
(74) *Attorney, Agent, or Firm* — Ryan A. Schneider; Troutman Sanders LLP

(57) ABSTRACT

For the purpose of manufacturing a package, an entirety is provided by means of injection molding, the entirety including a plastic tray (10) having an open side and a ring-shaped plastic cover rim (20) which is located at the open side of the tray (10), at a circumferential rim of the tray (10), and which surrounds that circumferential rim. The cover rim (20) is connected to the tray (10) by means of a relatively thin plastic film, wherein the cover rim (20) and the tray (10) are detached from each other by forcing a limited mutual movement of the cover rim (20) and the tray (10). Furthermore, a piece of cover foil (40) is provided and connected to at least the cover rim (20). Preferably, the cover rim (20) and the tray (10) are adapted to be capable of getting into engagement with each other by means of a snap connection after they do no longer form an integral entirety with each other.

14 Claims, 3 Drawing Sheets

(51) Int. Cl.
*B29C 65/18* (2006.01)
*B29C 65/78* (2006.01)
*B29C 65/00* (2006.01)

(52) U.S. Cl.
CPC ..... *B29C2045/0065* (2013.01); *B65D 43/0212* (2013.01); *B65D 2543/00037* (2013.01); *B65D 2543/00194* (2013.01); *B65D 2543/0024* (2013.01); *B65D 2543/00296* (2013.01); *B65D 2543/00324* (2013.01); *B65D 2543/00435* (2013.01); *B65D 2543/00527* (2013.01); *B65D 2543/00537* (2013.01); *B65D 2543/00629* (2013.01); *B65D 2543/00685* (2013.01); *B65D 2543/0074* (2013.01); *B65D 2543/00796* (2013.01); *B29C 65/18* (2013.01); *B29C 65/7841* (2013.01); *B29C 66/112* (2013.01); *B29C 66/131* (2013.01); *B29C 66/232* (2013.01); *B29C 66/53461* (2013.01); *B29C 66/81422* (2013.01); *B29C 66/81431* (2013.01); *B29C 66/81463* (2013.01)

(56) References Cited

U.S. PATENT DOCUMENTS

| | | | |
|---|---|---|---|
| 4,079,567 A | 3/1978 | Spruyt et al. | |
| 5,992,710 A * | 11/1999 | Lovell et al. | 222/525 |
| 6,142,341 A | 11/2000 | Uematsu | |
| 6,192,569 B1 | 2/2001 | Schneider et al. | |
| 7,105,119 B2 * | 9/2006 | Kanie et al. | 264/238 |
| 2007/0194495 A1 | 8/2007 | Henderson et al. | |

FOREIGN PATENT DOCUMENTS

| | | |
|---|---|---|
| EP | 0513888 | 11/1992 |
| EP | 1930253 A1 | 6/2008 |
| EP | 2319675 A1 | 5/2011 |
| FR | 2618411 A1 | 1/1989 |
| WO | 9950050 A1 | 10/1999 |
| WO | 2004033324 A1 | 4/2004 |
| WO | 2005039997 A1 | 5/2005 |
| WO | 2007071252 A1 | 6/2007 |
| WO | 2008031766 A1 | 3/2008 |

* cited by examiner

METHOD FOR MANUFACTURING A PACKAGE

CROSS-REFERENCE TO RELATED APPLICATIONS

This application is a US National Stage of International Application No. PCT/NL2011/000082, filed 20 Dec. 2011, which claims the benefit of NL 1038469, filed 22 Dec. 2010, both herein fully incorporated by reference.

The invention relates to a method for manufacturing a package, wherein an entirety is provided by means of injection moulding, the entirety including a plastic tray having an open side and a ring-shaped plastic cover rim which is located at the open side of the tray, at a circumferential rim of the tray, and which surrounds that circumferential rim, and which is connected to the tray by means of a relatively thin plastic film.

Such a method is known, for example, from FR 2 618 411. According to the known method, in order to seal the tray, a piece of cover foil is provided, which is connected to at least the cover rim, and possibly also to the tray. At first use of the package, a user breaks the thin film between the cover rim and the tray, and subsequently pulls the entirety of cover rim and cover foil away from the tray, wherein a possible connection between the cover foil and the tray is broken. From that first use on, the entirety of cover rim and cover foil, which will hereinafter be referred to as cover, can be placed back on the tray or removed from the tray again, according to liking. Near the open side, the tray has a recess into which a portion of the cover rim can snap, so that on the basis thereof it is possible to repeatedly establish a temporary connection between the cover and the tray.

An important advantage of the known method is that until first use, the internal space of the tray can remain fully sealed from the outside world. The connection between the cover foil and at least the cover rim can be realised along the entire circumference of the cover rim, so that there is not any interruption of the connection which might be a leak between the internal space of the tray and the outside world. Another important advantage is that material is saved by letting the cover foil which is used in a first instance for completely sealing the internal space of the tray be an integral part of the cover. This is different than many conventional situations in which a piece of cover foil is connected to a tray first, after which a complete cover is placed on the sealed tray, covering the cover foil, usually by means of a snap connection. In such situations, at first use, a user removes the cover from the tray, and subsequently pulls the cover foil away from the tray, and throws it away, or possibly leaves it at the tray, in a state of being only partially detached. In any case, the cover foil does no longer have a sealing function then. After first use, it is only the cover by means of which this function is taken care of.

Especially in packing food products, it is important that a tray is sealed in a reliable and air-tight manner before first use. In that case, there is practically no risk that the tray can open unintendedly, and that the content of the tray can go to waste. Also, a certain shelf life of the packed food products is guaranteed.

WO 2005/039997 relates to a method for manufacturing a package having a tray and a cover comprising a cover rim and a piece of cover foil, wherein the tray and the cover rim are formed separately from each other and then put together, or wherein the tray and the cover rim are connected to each other through one or more small pieces of material, which serve as hinges in that case. In both cases, the cover rim needs to be placed on the tray first, in the correct manner, prior to applying the cover foil.

A disadvantage of the method known from FR 2 618 411 is that breaking the thin film between the cover rim and the tray needs to be done by a user. A disadvantage of the method known from WO 2005/039997 is that an additional step of placing the cover rim on the tray needs to be performed before the cover foil can be applied to the assembly of tray and cover rim.

It is an object of the invention to provide a method for manufacturing a package having a plastic tray, a plastic cover rim and a piece of cover foil, wherein as less as possible material is used, wherein the manufacturing process can be efficient, wherein the user-friendliness is as large as possible, and wherein it is possible to provide a reliable seal of the tray before first use, i.e. a seal by means of a physical connection between the tray and the cover foil, which can be broken in first use.

The object as set is achieved by a method for manufacturing a package, wherein an entirety is provided by means of injection moulding, the entirety including a plastic tray having an open side and a ring-shaped plastic cover rim which is located at the open side of the tray, at a circumferential rim of the tray, and which surrounds that circumferential rim, and which is connected to the tray by means of a relatively thin plastic film, wherein the cover rim and the tray are detached from each other by forcing a limited mutual movement of the cover rim and the tray, and wherein a piece of cover foil is provided and is connected to at least the cover rim.

With the method according to the invention, contrary to what is known from FR 2 618 411, the thin film between the cover rim and the tray is broken during the manufacturing process. Thus, that does not need to be done by a user at first use. With the method according to the invention, contrary to what is known from WO 2005/039997, the cover rim is in a position at the open side of the tray already directly after the manufacturing process of the entirety of tray and cover rim. Starting from this position, the film between the tray and the cover rim is broken. Also, a piece of cover foil is provided and connected to at least the cover rim. This can be done simultaneously with detaching the cover rim from the tray, but possibly also not earlier than when the cover rim and the tray are detached from each other and the mutual movement has ended, or prior to that. When the cover foil is connected to the cover rim before the cover rim is completely detached from the tray, it is prevented that a situation might arise in which the cover rim moves spontaneously with respect to the tray, for example, under the influence of gravity, and assumes an undesired position with respect to the tray in doing so.

In a practical application of the method according to the invention, the mutual movement of the cover rim and the tray is ended when a surface of the cover rim and a circumferential surface of the tray, which is located at the open side of the tray, are located at a substantially equal level. When the tray is being considered in a normal orientation, in which the open side of the tray and the cover rim can be said to be located at a top side, the circumferential surface of the tray can be understood such as to mean a ring-shaped surface at the top side of the tray. In case of the practical application as mentioned, there are concentric top surfaces of the cover rim and the tray, and these top surfaces are put to a substantially equal level, so that a usable supporting surface for a portion of the piece of cover foil at the circumference of the piece is obtained, and it is possible to realise the desired connection between the cover foil and at least the cover rim in that situation. That does not alter the fact that it is also possible to establish the desired connection as mentioned already at an earlier stage, as has already been described in the foregoing.

When it is desired to have a fixed connection between the tray, the cover rim and the piece of cover foil prior to first use, in order to prevent the cover, i.e. the combination of the cover rim and the piece of cover foil, from getting detached from the tray unintendedly, and to guarantee a durable sealing of the internal space of the tray from the outside world, it is possible that the piece of cover foil is connected to both the tray and the cover rim. In that case, a stronger connection between the piece of cover foil and the cover rim than between the piece of cover foil and the tray can be realised, so that the piece of cover foil automatically detaches from the tray and not from the cover rim when a user detaches the foil at first use. When a continuous connection is realised along the entire circumference of the tray, at the open side of the tray, and along the entire cover rim, double sealing of the internal space of the tray is obtained, which offers extra security in respect of protecting a possible content of the tray from external influences.

The limited mutual movement of the cover rim and the tray, which is forced for the purpose of detaching the cover rim and the tray from each other, can be a linear movement. Such a movement can be performed in a simple manner. For example, in a practical case, it can be so that the cover rim is moved downwards only a small bit with respect to the tray.

As is the case with most conventional packages, it is handy when the cover rim and the tray are formed with components which are adapted to establish a snap connection between the cover rim and the tray in case of a mutual movement of the cover rim and the tray. In such a case, it can be so that the mutual movement of cover rim and the tray is ended with establishing a snap connection between the cover rim and the tray. The manufacturing process then comprises the following steps: manufacturing the entirety of tray and cover rim by means of injection moulding, forcing a mutual movement of the tray and the cover rim until they snap onto each other, wherein the thin film which originally was present between the tray and the cover rim gets broken, and providing a piece of cover foil and attaching the cover foil to at least the cover rim. The components of the tray and the cover rim which play a role in establishing a snap connection can have any suitable design within the framework of the invention. For example, the cover rim can be formed with an internal circumferential surface having a receded portion. The dimensions of the receded portion can be such that the cover rim first springs outwards to some extent, and subsequently directly springs inwards again when reaching the receded portion when the cover rim is moved along the tray. In that case, at the moment of springing inwards, the snap connection is realised.

It is advantageous when the relatively thin film between the tray and the cover rim is formed with interruptions. The fact is that in that way, it is achieved that it is possible to manufacture the tray and the cover rim as one entirety through a injection moulding process, and to have the tray and the cover rim in a desired mutual position before the mutual connection between those two components is broken on the one hand, and that it is possible to perform that breaking of that mutual connection in an easy manner on the other hand, without a need for much force in the process.

The injection moulding process of the entirety of tray and cover rim can be performed in such a way that plastic is supplied only at the side of the tray, wherein the formation of the thin film plays a role in having available plastic for forming the cover rim. In particular, for the purpose of manufacturing the entirety of the tray and the cover rim by means of injection moulding, a mould can be used in which a cavity for forming the cover rim is in communication with a cavity for forming the tray, through a cavity for forming the relatively thin film, wherein plastic is supplied only to the cavity for forming the tray during injection moulding.

For the purpose of establishing the connection between the piece of cover foil and at least the cover rim, each suitable technique for letting two plastic components get attached to each other can be applied. For instance, it is possible to provide for local supply of heat, so that the components get connected to each other as they melt at the location in question. It can be advantageous to apply means for supporting at least the cover rim during establishment of the connection between the piece of cover foil and at least the cover rim.

The package which is manufactured by means of the method according to the invention can be applied for packing various materials. As has been noted earlier, packing food products is surely one of the possibilities. In general, the material which needs to be packed is placed inside the tray before the piece of cover foil is connected to at least the cover rim.

The invention will be explained in more detail on the basis of the following description of a method for manufacturing a package, wherein an entirety is formed by means of injection moulding, the entirety including a tray and a cover rim, wherein, starting from an initial position, the cover rim is detached from the tray and is snapped on the tray, and wherein the tray is sealed by applying a piece of cover foil. Reference will be made to the drawing, in which equal reference numerals indicate equal or similar parts, and in which:

FIG. 1 diagrammatically shows a cross-section of an entirety of a tray and a cover rim;

FIG. 2 diagrammatically shows a top view of the entirety of the tray and the cover rim;

FIG. 3 diagrammatically shows a cross-section of a detail of the entirety of the tray and the cover rim;

Figure 1:
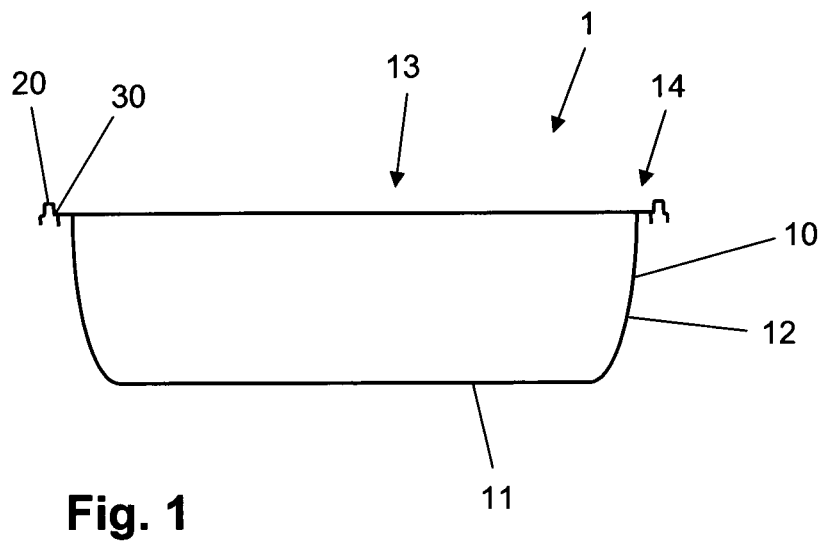
Figure 2:
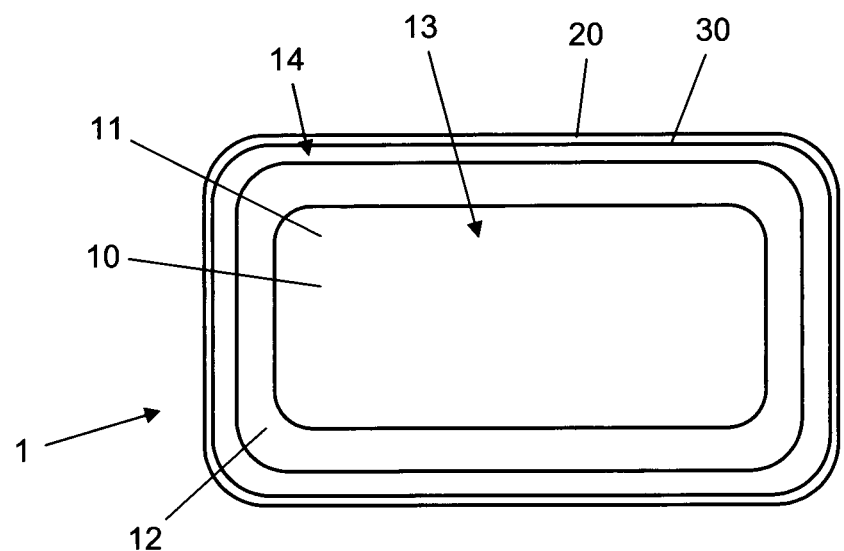
Figure 3:
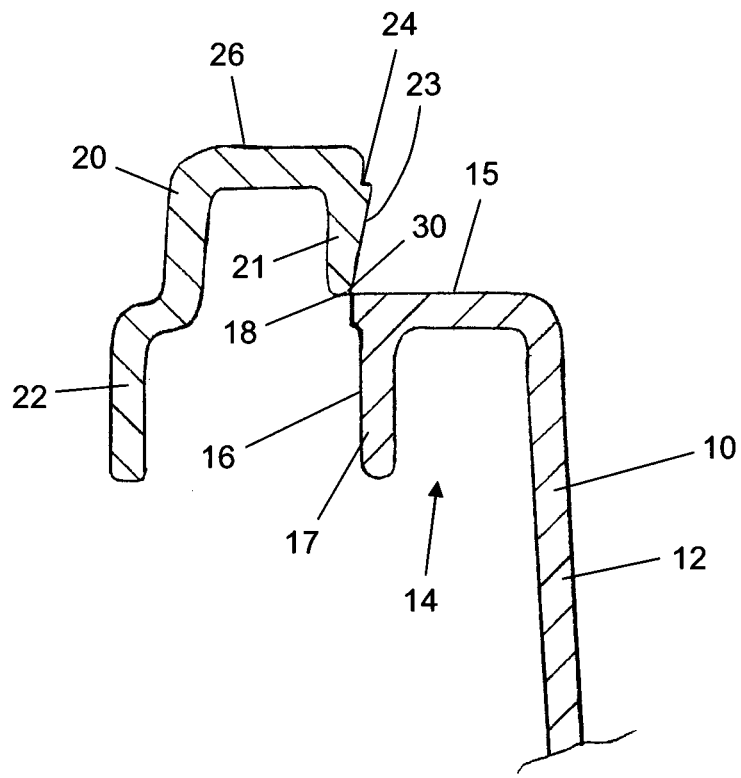

FIGS. 1 and 2 show an entirety 1 of a plastic tray 10 and a plastic cover rim 20, which is formed by means of injection moulding. In the shown example, the tray 10 has a bottom 11 and a standing wall 12 extending from the bottom 11, and having a substantially rectangular circumference. Within the framework of the invention, any shape of the tray 10 is possible, provided that the tray 10 has an open side 13, because the invention relates to sealing the open side 13 of the tray 10, among other things. In the following description, a normal orientation of the tray 10 is assumed, i.e. an orientation in which the bottom 11 of the tray 10 is at the bottom side, and in which the open side 13 is at the top side. At the open side 13, along the entire circumference, the tray 10 is provided with a specially designed rim portion 14 having a top surface 15 and an outer surface 16, which are circumferential surfaces of the tray 10, and an outer projection 17, as can clearly be seen in the detail of the entirety 1 of the tray 10 and the cover rim 20 shown in FIG. 3. For sake of completeness, it is noted that in this context, the term "outer" is related to a central axis (axis of symmetry) of the tray 10. The function of the rim portion 14 will be elucidated in the following.

Figure 4:
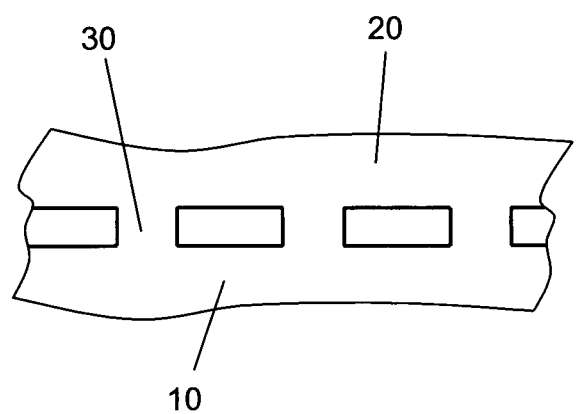
FIG. 4 illustrates an application of a perforated film between the tray and the cover rim.

The cover rim 20 is ring-shaped and completely surrounds the tray 10 at the open side 13, wherein the cover rim 20 is fixedly connected to the tray 10, at a circumferential rim 18 of the tray 10. Between the cover rim 20 and the tray 10, a thin plastic film 30 is present. FIG. 4 illustrates the fact that the film 30 can be perforated, so that the connection may be present along the entire circumference of the tray 10 and the cover rim 20, but is also interrupted at defined places.

The cover rim 20 has an inner projection 21 and an outer projection 22. For sake of completeness, it is noted that in this context, the terms "inner" and "outer" are related to a central axis (axis of symmetry) of the cover rim 20. The functions of these projections 21, 22 will be elucidated in the following. As seen in the normal orientation of the entirety 1 of the tray 10 and the cover rim 20, the projection 17 of the tray 10 and the projections 21, 22 of the cover rim 20 extend in a substantially vertical, downward direction.

As has been noted earlier, the entirety 1 of the tray 10 and the cover rim 20 is formed by means of injection moulding. Injection moulding is a process which is known per se, and for that reason, will not be elucidated further here. Within the framework of the invention, the tray 10 and the cover rim 20 are formed as the entirety 1 as mentioned, wherein an injection mould (not shown) is applied with spaces for forming the tray 10 and the cover rim 20 which communicate with each other through a narrow space for forming the thin film 30. As a result, it is possible to form the entirety 1 by only supplying plastic to the space for forming the tray 10, wherein the space for forming the cover rim 20 is filled with plastic flowing from the space for forming the tray 10, and reaching this space through the narrow space for forming the thin film 30. The extent to which the thin film 30 can be perforated is also determined by the desire to be able to supply material for forming the cover rim 20 from the space for forming the tray 10.

As soon as the entirety 1 of the tray 10 and the cover rim 20 is released from the mould after injection moulding and is cooled down to a sufficient extent, a following step in the procedure can be performed. In this step, a downward pressure is exerted on the cover rim 20, wherein the film 30 between the cover rim 20 and the tray 10 gets completely broken, and, as a consequence, the cover rim 20 gets detached from the tray 10. When the film 30 is perforated, this process of breaking away the cover rim 20 from the tray 10 is facilitated. At a certain moment during the downward movement of the cover rim 20, the cover rim 20 snaps underneath the rim portion 14 of the tray 10, after which the downward movement is stopped. In this example, the snap connection is realised on the basis of the design of the inner projection 21 of the cover rim 20. An inner surface 23 of this projection 21, which is a interior circumferential surface of the cover rim 20, is bevelled to some extent, as a result of which it is achieved that during the downward movement, under the influence of contact between the said inner surface 23 of the projection 21 and the outer surface 16 of the rim portion 14 of the tray 10, the inner projection 21 is pressed further and further in the direction of the outer projection 22, which is possible on the basis of elastic properties of the plastic. In the inner surface 23 of the projection 21 of the cover rim 20, a receded portion 24 is present, and as soon as it has been moved beyond the outer surface 16 of the rim portion 14 of the tray 10, there is room for the cover rim 20 to assume its original shape. At that moment, the snap connection is a fact, wherein a position of the cover rim 20 with respect to the rim portion 14 of the tray 10 is fixed because the inner projection 21 of the cover rim 20 engages with the outer projection 17 of the rim portion 14 of the tray 10, and a possible upward movement of the cover rim 20 cannot occur because a portion of the rim portion 14 having the outer surface 16 hinders such a movement.

Figure 5:
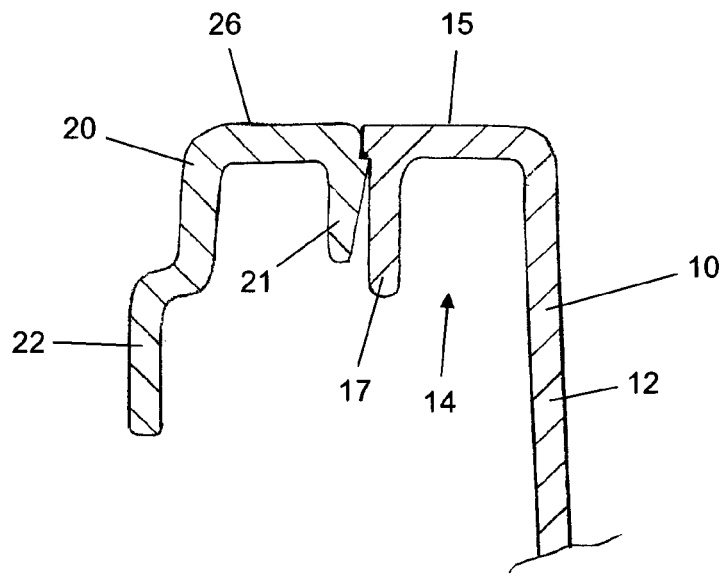
FIG. 5 shows the same detail as FIG. 3, for a situation in which the film is broken and a snap connection between the tray and the cover rim is established.
Figure 6:
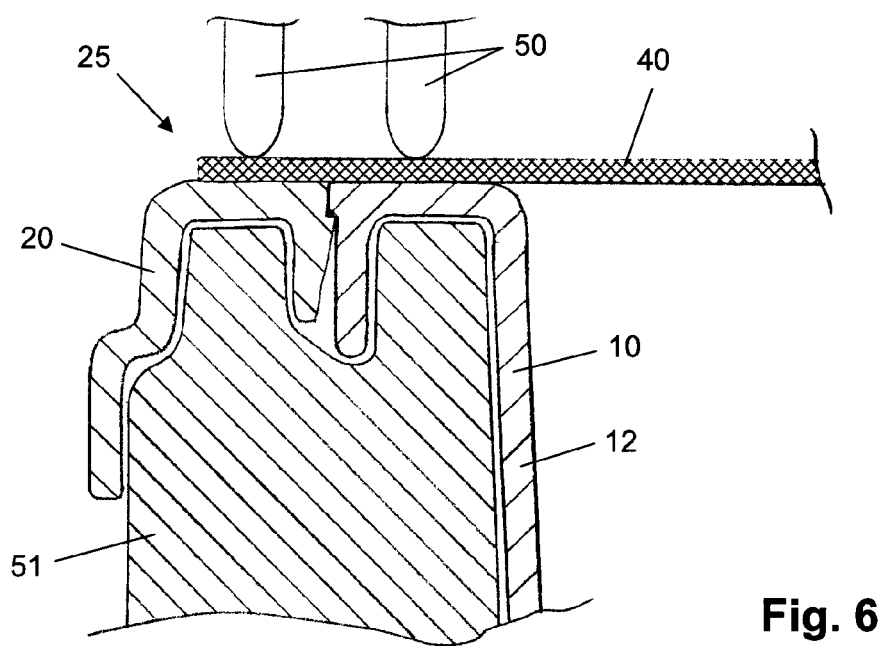
FIG. 6 illustrates how a piece of cover foil is connected to both the tray and the cover rim, wherein a rim portion of the tray and the cover rim is supported.

Once the snap connection has been established, the rim portion 14 of the tray 10 and the cover rim 20 have a mutual position as shown in FIG. 5, and a next step in the procedure can be performed, as illustrated in FIG. 6. This next step in the procedure is aimed at providing and applying a piece of cover foil 40 for sealing the open side 13 of the tray 10, and forming a complete cover 25 when combined with the cover rim 20.

In the mutual position of the rim portion 14 of the tray 10 and the cover rim 20 related to the snap connection, the top surface 15 of the rim portion 14 of the tray 10 and a top surface 26 of the cover rim 20 extend at a substantially equal level. In this way, both top surfaces 15, 26 can support the piece of cover foil 40 at the circumference thereof. In the shown example, the piece of cover foil 40 is connected to the assembly of the tray 10 and the cover rim 20 at two places, namely at the top surface 15 of the rim portion 14 of the tray 10, along the entire circumference, and at the top surface 26 of the cover rim 20, also along the entire circumference. As a result thereof, it is achieved that the tray 10 is sealed in an air-tight manner, and also that the cover 25 is put together, wherein there is a firm connection between the piece of cover foil 40 and the cover rim 20.

It is possible to connect the piece of cover 40 to the top surface 26 of the cover rim 20 at an earlier stage already. This is even possible during the mutual movement of the tray 10 and the cover rim 20, which is performed in order to realise the snap connection. Advantages are that in such a case, the manufacturing process can be faster, and that the cover rim 20 cannot be moved beyond the position related to the snap connection. Because the connection between the piece of cover foil 40 and the tray 10 usually does not need to be as strong as the connection between the piece of cover foil 40 and the cover rim 20, establishing the latter connection requires usually more time than establishing the first connection. When the connection requiring more time is already at least partially realised during the mutual movement of the tray 10 and the cover rim 20, time can be saved, and costs of the manufacturing process can thus turn out to be lower.

A possibility for establishing the connections between the piece of cover foil 40 and the tray 10 and the cover rim 20 is locally supplying heat, so that the cover foil 40 gets connected to the tray 10 and the cover rim 20 as it melts at defined places. This can be done in a manner known per se with the help of appropriate tools 50, which are usually referred to as knives 50, of which a portion is diagrammatically shown in FIG. 6. It can be advantageous to support the cover rim 20, and possibly also the rim portion 14 of the tray 10, during the connection process. To this end, a suitable support 51 is applied in that case, of which a portion is diagrammatically shown in FIG. 6.

The assembly of the tray 10 and the cover 25 is destined to be used for packing materials (not shown), which are placed in the tray 10 at any suitable moment prior to applying the piece of cover foil 40. In particular, the materials may comprise food products, for example, salads, nuts, butter, and other dairy products such as yoghurt. Usually, in the case of food products, it is important that the tray 10 is completely sealed prior to the first use. This is achieved with the above-described method. It is possible for the sealing of the tray 10 to take place in a modified atmosphere, or other conditions as desired.

When it is not necessary and/or not desired that the content of the package is separated from external influences prior to a first opening of the package by a user, it is possible to choose in favour of only establishing a connection between the cover foil 40 and the cover rim 20. For that matter, this connection does not necessarily need to be along the entire circumference, but this is preferred in view of the desire to obtain a firm cover 25, wherein the cover rim 20 and the piece of cover foil 40 cannot be easily pulled apart. In general, it is possible to determine the places where a connection needs to be obtained according to need, wherein it is especially required to take into account the possibility that the internal space of the tray 10 needs to be completely sealed.

In the shown example, the assembly of the tray 10 and the cover 25 is ready for first use after applying the desired connections. In that first use, a user takes hold of the cover rim 20 at a place on the outer projection 22, breaks the snap connection between the cover rim 20 and the tray 10, and pulls the cover 25 away from the tray 10, wherein the connection between the cover foil 40 and the tray 10 gets broken, while the connection between the cover foil 40 and the cover rim 20 is left intact. By tilting the receded portion 24 in the inner surface 23 of the inner projection 21 from underneath the portion of the rim portion 14 of the tray 10 having the outer surface 16, as it were, with the help of the outer projection 22, it is possible to break the snap connection. When the piece of cover foil 40 is connected to both the tray 10 and the cover rim 20 during the manufacturing process of the assembly, it is possible to choose in favour of letting the connection to the tray 10 be less strong than to the cover rim 20, as has been noted earlier, so that it is guaranteed that only the connection between the piece of cover foil 40 and the tray 10 is broken.

After the first use, the user can close the package again by putting the cover 25 back in place on the tray 10, and exerting a light downward pressure in the process, wherein the snap connection between the cover 25 and the tray 10 can be established again. The steps of opening the tray 10 again by breaking the snap connection and removing the cover 25, and closing the tray 10 again by putting the cover 25 in place on the tray 10 and establishing the snap connection, can be repeated according to liking, as often as desirable.

Important advantages of the above-described assembly of the tray 10 and the lid 25 and the way in which it can be manufactured are summed up in the following.

The assembly is suitable for packing food products which need to be packed in an air-tight manner prior to first use, because it is possible for a connection between the piece of cover foil 40 and the tray 10 to be established along the entire circumference. When the connection between the piece of cover foil 40 and the cover rim 20 is also along the entire circumference, there is even a double seal, even though the seal on the cover rim 20 is somewhat less reliable because it is positioned beyond a transition of the tray 10 to the cover rim 20.

For the purpose of sealing the tray 10 prior to the first use, there is no need for a separate piece of cover foil which does no longer have a function after the first use, different from what is the case in many conventional situations. As a consequence, the assembly is more environmentally friendly. Because the piece of cover foil 40 is integrated in the cover 25, a relatively light cover 25 is obtained, wherein material has been saved.

The manufacturing process of the assembly is relatively simple and cheap, because it does not need to comprise more steps than manufacturing an entirety 1 of a tray 10 and a cover rim 20 by means of injection moulding, detaching the cover rim 20 under the influence of pressure, and establishing a snap connection between the cover rim 20 and the tray 10 with a single and relatively short linear movement, and applying the piece of cover foil 40.

The assembly can easily be manipulated by a user, wherein, in first use, the snap connection between the cover 25 and the tray 10 can be broken and the cover 25 can be pulled away from the tray 10, in a simple manner, and wherein, in further use, the snap connection between the cover 25 and the tray 10 can easily be established or broken, over and over again.

It will be clear to a person skilled in the art that the scope of the present invention is not limited to the examples discussed in the foregoing, but that several variations and modifications thereof are possible without deviating from the scope of the invention as defined in the attached claims.

In respect of the piece of cover foil, it is noted that it can be manufactured from any suitable material, for example, plastic or aluminium. Also, the piece of cover foil 40 can be provided with a print, for example, for information purposes and/or advertisement purposes.

The invention can be summarised as follows. For the purpose of manufacturing a package, an entirety 1 is provided by means of injection moulding, the entirety 1 including a plastic tray 10 having an open side 13 and a ring-shaped plastic cover rim 20 which is located at the open side 13 of the tray 10, at a circumferential rim 18 of the tray 10, and which surrounds that circumferential rim 18. The cover rim 20 is connected to the tray 10 by means of a relatively thin plastic film 30, wherein the cover rim 20 and the tray 10 are detached from each other by forcing a limited mutual movement of the cover rim 20 and the tray 10. Furthermore, a piece of cover foil 40 is provided and connected to at least the cover rim 20. Preferably, the cover rim 20 and the tray 10 are adapted to be capable of getting into engagement with each other by means of a snap connection after they do no longer form an integral entirety with each other.

The invention claimed is:

1. Method for manufacturing a package, wherein an entirety is provided through injection moulding, the entirety including a plastic tray having a bottom, a standing wall and an open side, and a ring-shaped plastic cover rim which is located at the open side of the tray, at a circumferential rim of the tray, and which surrounds that circumferential rim, and which is connected to the tray through a relatively thin plastic film, wherein the injection moulding involves applying a injection mould with cavities for forming the tray and the cover rim, which communicate with each other through a narrow cavity for forming the relatively thin film, and supplying plastic to the mould for filling the cavities of the mould, wherein the entirety of the tray and the cover rim is released from the mould after injection moulding and is allowed to cool down to a sufficient extent for detaching the cover rim and the tray from each other in a following step which involves moving the cover rim downwardly with respect to the tray, wherein the relatively thin film between the cover rim and the tray gets completely broken, after which the downward movement of the cover rim with respect to the tray is stopped, and wherein a piece of cover foil is provided and is connected to at least the cover rim, during the downward movement of the cover rim with respect to the tray or after detachment of the cover rim from the tray.

2. The method according to claim 1, wherein the downward movement of the cover rim with respect to the tray is ended when a surface of the cover rim and a circumferential surface of the tray which is located at the open side of the tray are located at a practically equal level.

3. The method according to claim 1, wherein the piece of cover foil is connected to both the tray and the cover rim.

4. The method according to claim 3, wherein a stronger connection is realised between the piece of cover foil and the cover rim than between the piece of cover foil and the tray.

5. The method according to claim 3, wherein a continuous connection is realised along the entire circumference of the tray, at the open side of the tray, and along the entire cover rim.

6. The method according to claim 1, wherein the downward movement of the cover rim with respect to the tray, which is forced for the purpose of detaching the cover rim and the tray from each other, is a linear movement.

7. The method according to claim 1, wherein the cover rim and the tray are formed with components which are adapted to establish a snap connection between the cover rim and the tray in case of a downward movement of the cover rim with respect to the tray.

8. The method according to claim 7, wherein the downward movement of the cover rim and the tray is ended with establishing a snap connection between the cover rim with respect to the tray.

9. The method according to claim 7, wherein the cover rim is formed with an inner circumferential surface having a receded portion.

10. The method according to claim 1, wherein the relatively thin film between the tray and the cover rim is formed with interruptions.

11. The method according to claim 1, wherein during injection moulding of the entirety of the tray and the cover rim in the mould, plastic is supplied only to the cavity for forming the tray.

12. The method according to claim 1, wherein the connection between the piece of cover foil and at least the cover rim is established under the influence of local heat supply.

13. The method according to claim 1, wherein a support is applied for supporting at least the cover rim during establishment of the connection between the piece of cover foil and at least the cover rim.

14. The method according to claim 1, wherein material to be packed is placed in the tray before the piece of cover foil is connected to at least the cover rim.

\* \* \* \* \*